(12) United States Patent
Sugiyama

(10) Patent No.: US 7,095,926 B2
(45) Date of Patent: Aug. 22, 2006

(54) OPTICAL DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/002,114

(22) Filed: Dec. 3, 2004

(65) Prior Publication Data

US 2006/0056766 A1    Mar. 16, 2006

(30) Foreign Application Priority Data

Sep. 14, 2004   (JP) ............................. 2004-266862

(51) Int. Cl.
*G02B 6/42* (2006.01)

(52) U.S. Cl. .................... 385/40; 385/2; 385/8; 385/39

(58) Field of Classification Search ................... 385/2, 385/3, 8, 39, 40, 41–50
See application file for complete search history.

(56) References Cited

U.S. PATENT DOCUMENTS

2005/0175271 A1 *  8/2005  Sugiyama et al. ............. 385/3

FOREIGN PATENT DOCUMENTS

| JP | 4-123018  | 4/1992 |
|----|-----------|--------|
| JP | 2734708   | 1/1998 |
| JP | 10-90638  | 4/1998 |
| JP | 2001-4966 | 1/2001 |

* cited by examiner

*Primary Examiner*—Phan Palmer
(74) *Attorney, Agent, or Firm*—Staas & Halsey LLP

(57) ABSTRACT

An object of the present invention is to provide an optical device, in which a stress applying on ridge sections caused by the difference of thermal expansion between a metal film of which a ground electrode is formed and a substrate is reduced. In order to achieve this, in the optical device of the present invention, the ratio of the volume of a ground electrode portion formed at the position of other groove to the area of opening part of the other groove is smaller than the ratio of the volume to the area of a ground electrode portion formed at the position except the other groove.

34 Claims, 11 Drawing Sheets

OPTICAL DEVICE

BACKGROUND OF THE INVENTION

1) Field of the Invention

The present invention relates to an optical device, in particular, which is used in optical communication suitably.

2) Description of the Related Art

In an optical device using an electrooptic crystal such as, a $LiNbO_3$ (lithium niobate) (hereinafter, simply referred to as LN) substrate, and a $LiTaO_2$ substrate, an optical waveguide is formed in a process in which a metal film is formed on a part of the crystal substrate and thermal diffusion is applied thereon, or proton exchange is executed in a benzoic acid after applying a patterning, after this, electrodes are formed near the optical waveguide. And the optical device is used as an optical control device, which controls light signals transmitting through the optical waveguide by an electric field applied by the electrodes.

FIG. 13 is a schematic plane view showing an optical device that is used as the above-mentioned optical control device. In an optical control device 100, a Mach-Zehnder type optical waveguide 104, which is composed of an input waveguide 101, two parallel waveguides 102-1 and 102-2, and an output waveguide 103, is formed on an LN substrate 108. This optical waveguide 104 is generally adopted in the case where the optical waveguide 104 is used as an optical modulator, and coplanar electrodes, in which a signal electrode 105 is formed above the parallel waveguide 102-1 and a ground electrode 106 is formed above the parallel waveguide 102-2, are formed.

And as in this optical device 100, in the case where a Z cut substrate is used, since the change of refractive index by an electric field in the Z-direction is utilized, the signal electrode 105 and the ground electrode 106 are formed right above the parallel waveguide 102-1 and the parallel waveguide 102-2 respectively. FIG. 14 is a sectional view of the optical device shown in FIG. 13 when seen in the direction of arrows A and A'.

At this time, the signal electrode 105 is formed above the parallel waveguide 102-1 and the ground electrode 106 is formed above the parallel waveguide 102-2 by patterning. However, in order to prevent light transmitting through the parallel waveguides 102-1 and 102-2 from being absorbed by the signal electrode 105 and the ground electrode 106, as shown in FIG. 14, between the LN substrate 108 and the signal electrode 105, and between the LN substrate and the ground electrode 106, a buffer layer 107 is interposed. As the buffer layer 107, for example, $SiO_2$ having the thickness of approximately 0.2 μm to 1 μm is used. In the case where the optical device 100 shown in FIG. 13 is driven at a high speed as an optical modulator, a traveling-wave electrode is formed by connecting a resistor to the terminals of the signal electrode 105 and the ground electrode 106, and microwave signals are inputted from the input side. At this time, the refractive index of each of the two parallel waveguides 102-1 and 102-2 is changed by +Δna and −Δnb respectively, and since the phase difference between the two parallel waveguides 102-1 and 102-2 is changed, therefore, signal light whose intensity was modulated is outputted from the output waveguide 103.

In the optical device 100 using the LN substrate 108 having the electrooptic effect shown in FIG. 13, as shown in FIG. 14, both sides of the parallel waveguides (optical waveguides) 102-1 and 102-2 in the interaction region and the region between the parallel waveguides 102-1 and 102-2 are trenched by etching and the like, and grooves 109-1 to 109-3 are formed, with this, an optical waveguide having a ridge structure is formed.

At the optical waveguide having the ridge structure, compared with an optical waveguide formed on a flat substrate without forming the grooves 109-1 to 109-3, when an electric field is applied through the signal electrode 105 and the ground electrode 106, the electric field applying efficiency to the parallel waveguides 102-1 and 102-2 can be improved, and its driving voltage can be made low. Therefore, the modulation frequency, in the case where the optical device 100 is used as an optical modulator, can be made into a broad band.

And as shown in FIG. 15, a Mach-Zehnder type optical waveguide 111, in which the parallel waveguides 102-1 and 102-2 shown in FIG. 13 are changed to curved waveguides 110-1 and 110-2, is formed on the LN substrate 108. And an optical device 114, which comprised a signal electrode 112 and a ground electrode 113 formed corresponding to these curved waveguides 110-1 and 110-2, is formed. With this structure, it is known that the size of the optical device can be made smaller than that of the optical device 100 shown in FIG. 13. Particularly, at this optical device 114, in a process in which the curved waveguides 110-1 and 110-2 being optical waveguides in the interaction region are made into optical waveguides having the ridge structure, the effect that light is shut in the curved waveguides 110-1 and 110-2 is increased, and the loss can be reduced. FIG. 16 is a sectional view of the optical device 114 shown in FIG. 15 when seen in the direction of arrows B and B'.

As existing technologies relating to the present invention, the following Patent Literatures 1 to 4 exist.

In the Patent Literature 1, a technology, in which a Mach-Zehnder type optical waveguide is formed on a flat substrate and an auxiliary ground electrode is separately formed at the outside of a ground electrode disposed facing to a signal electrode symmetrically and the ground electrode and the auxiliary ground electrode are connected electrically by a ground electrode bridge, has been described.

And in the Patent Literature 2, an optical control device, in which a signal electrode and a ground electrode are formed on two parallel waveguides of a ridge type via a buffer layer, has been described. And in the Patent Literature 3, a waveguide type optical component, in which electrodes are disposed along the side surfaces of an optical waveguide of a ridge type, has been described. And in the Patent Literature 4, a ridge waveguide, in which a part of a ridge side wall has a concave angle, has been described.

[Patent Literature 1] Japanese Patent Laid-Open(Kokai) No. HEI 3-200924

[Patent Literature 2] Japanese Patent Laid-Open(Kokai) No. HEI 10-90638

[Patent Literature 3] Japanese Patent Laid-Open(Kokai) No. HEI 4-123018

[Patent Literature 4] Japanese Patent Laid-Open(Kokai) No. 2001-4966

At the optical devices 100 and 114 shown in FIGS. 13 to 16, in the case where the ground electrode is formed by the deposition of a metal film on plural ridges including grooves between the ridges, a stress, caused by the difference of thermal expansion (the difference of the coefficient of linear expansion) between the metal film of which the ground electrode is formed and the substrate, is applied to the ridge sections (especially, the edges of the ridge sections). And the inventor of the present invention found and confirmed that the above-mentioned stress has exerted an influence on the refractive index of light transmitting through the ridge sections of the optical waveguide.

The stress applying on the ridge sections changes depending on a temperature, therefore, the influence of the stress on the refractive index of light transmitting through the optical waveguide can also be changed by the temperature. And the change of the refractive index of light depending on the temperature causes a bias voltage applying to the operating point to change depending on the change of the temperature, at the time when light is controlled by using the optical device 100 or 114. This is a problem.

FIG. 17 is a graph showing a change of the output level of light for a voltage applying to the signal electrode. Usually, the light is controlled by changing the voltage to be applied in the range of R shown in FIG. 17. However, the value of $V_0$ being the above-mentioned bias voltage changed depending on the change of the temperature, therefore, this prevents stable optical control.

In the technologies described in the above-mentioned Patent literatures 1 to 4, a structure, in which the stress by the difference of thermal expansion (the difference of the coefficient of linear expansion) between the metal film of which the ground electrode is formed and the substrate is reduced, has not been described.

SUMMARY OF THE INVENTION

It is therefore an object of the present invention to provide an optical device, in which a stress applying on ridge sections caused by the difference of thermal expansion between a metal film of which a ground electrode is formed and a substrate can be reduced. In order to achieve the above-mentioned object, an optical device according to the present invention comprises a substrate having an electrooptic effect, a first ridge section formed by being sandwiched between two grooves formed on the substrate, a second ridge section, positioned adjacent to the first ridge section, formed by being sandwiched between one of the two grooves and other groove formed at the outside of the second ridge section, an optical waveguide formed inside the first ridge section, an optical waveguide formed inside the second ridge section, a signal electrode formed above the first ridge section, and a ground electrode, which is formed above the substrate in a state in which the ground electrode sandwiches the signal electrode by having a gap of a predetermined interval for the signal electrode for applying reference electric potential to the signal electrode. And the ratio of the volume of a ground electrode portion formed at the position of the other groove to the area of opening part of the other groove is smaller than the ratio of the volume to the area of a ground electrode portion formed at the position except the other groove.

In this case, the ground electrode portion formed at the position of the other groove can be formed in a plurality of regions by separating each other. And preferably, the ground electrode portion formed at the position of the other groove can be formed in the plurality of regions by separating each other having an interval of approximately 10 μm or more and approximately 5 mm or less.

Further, preferably, each width of the ground electrode portions formed separately from each other in the plurality of regions at the position of the other groove can be approximately 3 μm to approximately 20 μm.

And the optical device can comprise a supporting mechanism for supporting the ground electrode portion at the position of the other groove.

In this case, the supporting mechanism can be composed of a groove dividing section for dividing the other groove, can be composed of an island section formed in the other groove, or can be composed of a groove narrow width section in which the width of the other groove is made narrow.

And the ground electrode portion formed at the position of the other groove can be composed as a conductive film being thinner than the ground electrode portion formed at the position except the position of the other groove.

In this case, the ground electrode portion formed at the position except the position of the other groove is composed of a conductive thin film section and a conductive thick film section formed on the conductive film, and the conductive film formed at the position of the other groove can be formed integrally together with the conductive thin film section being a part of the ground electrode portion formed at the position except the other groove.

Further, preferably, the thick film section and the conductive thin film section formed integrally together with the conductive film are formed by the same material.

And also, the thickness of the ground electrode portion formed at the position of the other groove can be equal to approximately 1 μm or less.

Further, the ground electrode can comprise a first part on the second ridge section, a second part formed at the position of the other groove adjacent to the second ridge section, and a third part formed further outside the second part.

In this case, preferably, the difference between the width of the signal electrode and the width of the first part being the ground electrode is made equal to approximately 5 μm or less.

Further, the width of the first part being the ground electrode is made narrower than the width of the second ridge section.

And the width of the first ridge section and the width of the second ridge section are almost the same.

Further, the relative position relation between the first ridge section and the signal electrode can be the same as the relative position relation between the second ridge section and the first part.

And the center of the signal electrode can be equal to the center of the first ridge section.

Further, the center of the first part being the ground electrode can be equal to the center of the second ridge section.

Moreover, the thickness of the signal electrode can be almost equal to the thickness of the first part.

And at least one of additional outside ridge sections is formed with an additional other groove positioned outside the additional outside ridge section at the outside of the first ridge section or the outside of the second ridge section, and the ratio of the volume of a ground electrode portion formed at the position of the additional other groove to the area of opening part of the additional other groove positioned outside the additional outside ridge section can be smaller than the ratio of the volume to the area of a ground electrode portion formed at the position except the other and additional other grooves.

In this case, the additional outside ridge section is formed with an additional other groove at the position further outside the additional outside ridge section so that the symmetric number of ridge sections for the first ridge section are formed.

Further, the ground electrode is configured so that ground electrode portions formed at the positions of plural other grooves are electrically connected to each other, and the ground electrode portion formed at the position of each of other grooves can be formed separately in plural regions in a different pattern.

And an optical waveguide formed respectively in the first ridge section and in the second ridge section can be a straight line waveguide or a curved waveguide having a curve being equal to 90 degrees or more.

Further, an optical device according to the present invention comprises a substrate having an electrooptic effect, a first ridge section formed by being sandwiched between two grooves formed on the substrate, a second ridge section, positioned adjacent to the first ridge section, formed by being sandwiched between one of the two grooves and other groove formed at the outside of the second ridge section, an optical waveguide formed inside the first ridge section, an optical waveguide formed inside the second ridge section, a signal electrode formed above the first ridge section, and a ground electrode formed above the second ridge section. And the difference between the width of the signal electrode above the first ridge section and the width of the ground electrode above the second ridge section is equal to approximately 5 µm or less.

As mentioned above, according to the present invention, the optical device is configured in a manner that the ratio of the volume of a ground electrode portion formed at the position of the other groove to the area of opening part of the other groove is smaller than the ratio of the volume to the area of a ground electrode portion formed at the position except the other groove. Therefore, there is an advantage that a stress applying on the second ridge section can be reduced.

DESCRIPTION OF THE PREFERRED EMBODIMENTS

Figure 1:
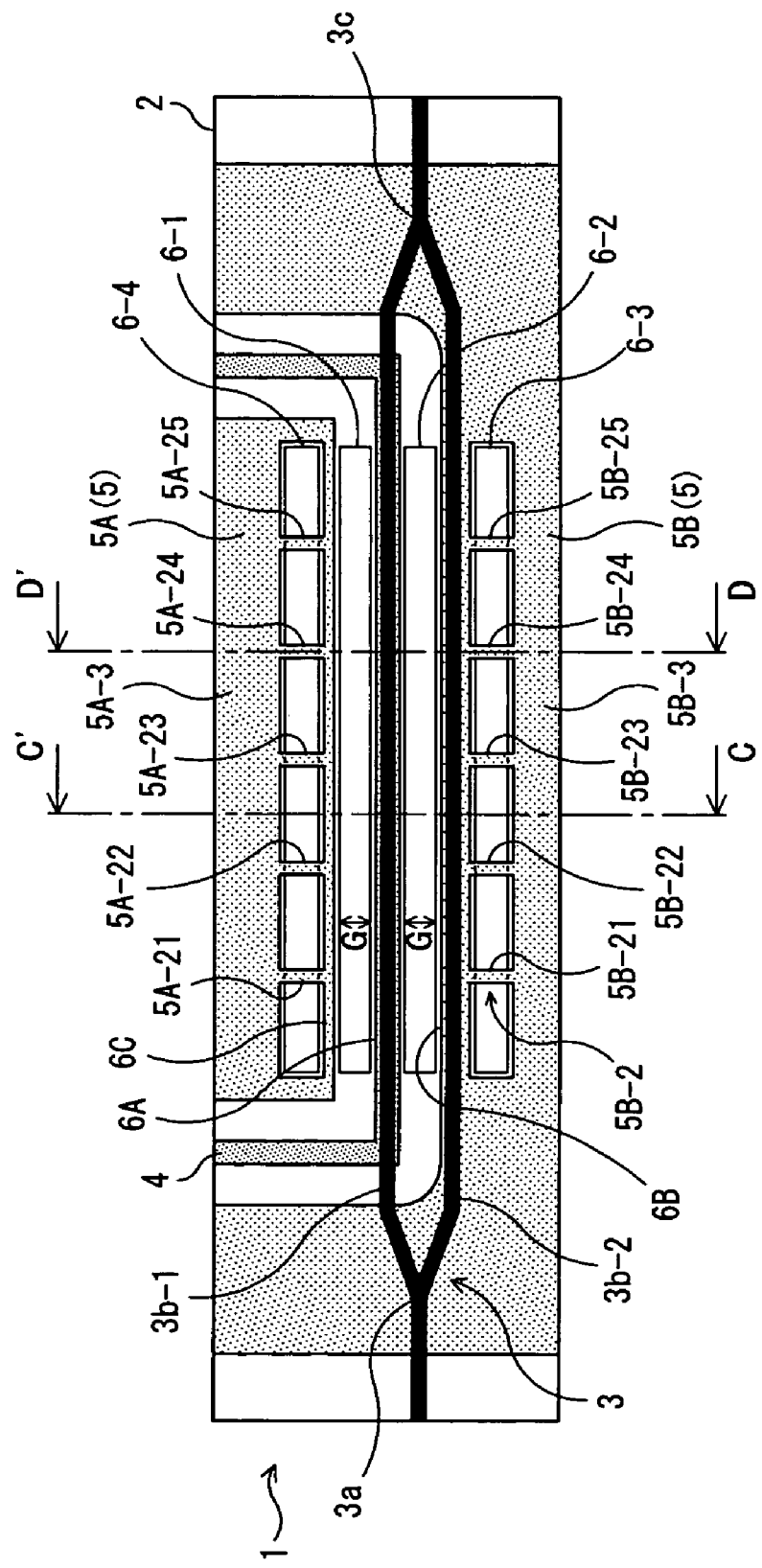
FIG. 1 is a schematic plane view showing an optical device according to a first embodiment of the present invention.

Referring now to the drawings, embodiments of the present invention are explained.

In this, the object of the present invention is to provide an optical device, in which a stress applying on ridge sections caused by the difference of thermal expansion between a metal film of which a ground electrode is formed and a substrate can be reduced. However, technical problems that can be solved by the technology of the present invention are the target problems to be solved by the present invention. And the object of the present invention is not prevented to provide a device or a method that solves the problems.

[A1] Explanation of First Embodiment

[A1-1] Structure of Optical Device 1 according to First Embodiment

Figure 2:
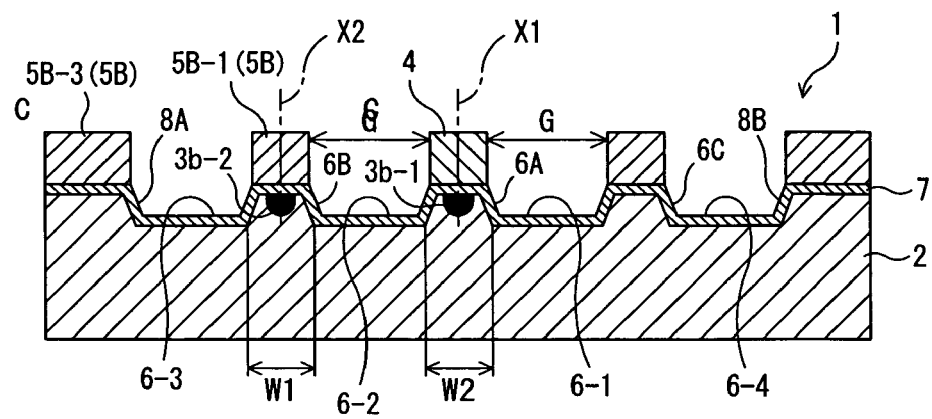
FIG. 2 is a sectional view of the optical device shown in FIG. 1 when seen in the direction of arrows C and C'.
Figure 3:
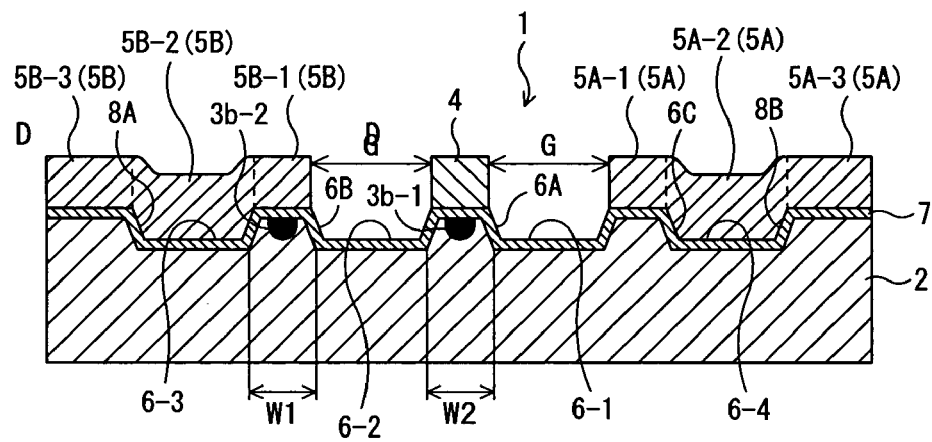
FIG. 3 is a sectional view of the optical device shown in FIG. 1 when seen in the direction of arrows D and D'.

FIG. 1 is a schematic plane view showing an optical device 1 according to a first embodiment of the present invention. FIG. 2 is a sectional view of the optical device 1 shown in FIG. 1 when seen in the direction of arrows C and C'. FIG. 3 is a sectional view of the optical device 1 shown in FIG. 1 when seen in the direction of arrows D and D'. In the optical device 1 shown in FIG. 1, for example, a Mach-Zehnder type optical waveguide 3 is formed on a substrate 2 having an electrooptic effect made of $LiNbO_3$ (lithium niobate, hereinafter, simply referred to as LN) and the like, by titanium diffusion or proton exchange, and a signal electrode 4 and a ground electrode 5 for applying an electric field to light transmitting through this optical waveguide 3 are formed. And the light transmitting through this optical waveguide 3 can be controlled by the electric field that the signal electrode 4 and the ground electrode 5 apply to.

In this, the Mach-Zehnder type optical waveguide 3, as shown in FIG. 1, is composed of a Y branching waveguide 3*a* positioned at the input side, two straight line waveguides 3*b*-1 and 3*b*-2, and a Y branching waveguide 3*c* positioned at the output side. Especially, the two straight line waveguides 3*b*-1 and 3*b*-2 being almost in parallel is a section that generates interaction between the electric field applied by the signal electrode 4 and the ground electrode 5 and transmitting light. Further, in order that the two straight line (optical) waveguides 3*b*-1 and 3*b*-2 are made into ridge optical waveguides, grooves 6-1 to 6-3 are formed at both sides of the two straight line waveguides 3*b*-1 and 3*b*-2 in the light transmitting direction.

And by making the two straight line waveguides 3*b*-1 and 3*b*-2 into the ridge optical waveguides, the electric field applying efficiency to the two straight line waveguides 3*b*-1 and 3*b*-2 can be improved when an electric field was applied from the signal electrode 4 and the ground electrode 5, and its driving voltage can be made low, and light wavelengths that are able to be modulated can be made into a broad band.

In this, a section sandwiched between the two grooves 6-1 and 6-2 being inner grooves includes the straight line waveguide 3*b*-1 and is configured as a first ridge section 6A.

And a section sandwiched between the groove 6-2 being the inner groove and the groove 6-3 being an outer groove (other groove) includes the straight line waveguide 3b-2 and is configured as a second ridge section 6B. In other words, the straight line waveguide 3b-1 is formed inside the first ridge section 6A, and the straight line waveguide 3b-2 is formed inside the second ridge section 6B.

In the first embodiment, as shown in FIG. 2 or FIG. 3, at both sides of the first ridge section 6A above which the signal electrode 4 is formed, the second ridge section 6B and a ridge section 6C are formed symmetrically. For this, an outer groove 6-4 is formed at the outside position of the inner groove 6-1, and the outer groove 6-3 is formed at the outside position of the inner groove 6-2. The ridge section 6C is sandwiched between the inner groove 6-1 and the outer groove 6-4.

And the signal electrode 4 and the ground electrode 5 are formed by the deposition of a metal film made of such as Au on the substrate 2 via a buffer layer 7. And signal electrode 4 is formed by a pattern that electrically connects two ends formed on one long length side of the substrate 2 through on the straight line waveguide 3b-1. And the ground electrode 5 is formed by a pattern that can apply reference electric potential to the signal electrode 4.

Actually, the ground electrode 5 comprises a first electrode portion 5A and a second electrode portion 5B, in a state in which the signal electrode 4 is sandwiched between the first electrode portion 5A and the second electrode portion 5B having a predetermined gap G between the signal electrode 4 and the first electrode portion 5A, and between the signal electrode 4 and the second electrode portion 5B. In this, the first electrode portion 5A is formed in the region surrounded by the above-mentioned signal electrode 4 on the surface of the substrate 2. And the second electrode portion 5B is formed in the region that includes the second ridge section 6B above which the straight line waveguide 3b-2 is formed on the surface of the substrate 2 in a state in which the second electrode portion 5B surrounds the signal electrode 4. In these first and second electrode portions 5A and 5B, specific forming patterns of the present invention are included.

That is, the second electrode portion 5B being a part of the ground electrode 5 comprises a first part 5B-1 formed on the second ridge section 6B, a second part 5B-2 formed at the position of the outer groove 6-3, and a third part 5B-3 formed on a bank 8A (refer to FIGS. 2 and 3) positioned outside the second part 5B-2. And the ratio of the volume of the ground electrode portion formed at the position of the outer groove 6-3 to the area of the opening part of the outer groove 6-3 is smaller than the ratio of the volume to the area of the ground electrode portion being the first part 5B-1 or the third part 5B-3 formed at the position except the outer groove 6-3.

Actually, at the second electrode portion 5B, as shown in FIGS. 1 to 3, the ground electrode portion, formed at the position of the outer groove 6-3 adjacent to the outside of the second ridge section 6B, are formed in a plurality of regions separately. That is, the second electrode portion 5B comprises the first part 5B-1 formed on the second ridge section 6B, the second part 5B-2 formed at the position of the outer groove 6-3, and the third part 5B-3 formed on the bank 8A (refer to FIGS. 2 and 3) positioned outside the second part 5B-2. And the second part 5B-2 is composed of five regions 5B-21 to 5B-25 in FIG. 1 in a state in which the second part 5B-2 becomes like a bridge between the first part 5B-1 and the third part 5B-3.

That is, as shown in FIG. 2, in the region of the outer groove 6-3 where the second part 5B-2 being a part of the ground electrode portion is not formed, the second electrode portion 5B is composed of the first part 5B-1 being a part of the ground electrode portion whose width is relatively narrow at the second ridge section 6B and the third part 5B-3 on the bank 8A. And in the region where the second part 5B-2 being a part of the ground electrode portion at the position of the outer groove 6-3 is formed, as shown in FIG. 3, the second electrode portion 5B is composed of the first part 5B-1, the third part 5B-3, and the second part 5B-2 at the position of the outer groove 6-3.

And also at the first electrode portion 5A, as shown in FIGS. 1 to 3, the ground electrode portion, formed at the position of the outer groove 6-4 adjacent to the outside of the ridge section 6C, is formed in a plurality of regions 5A-21 to 5A-25 separately at the position of the outer groove 6-4. That is, the first electrode portion 5A comprises a fourth part 5A-1 formed on the ridge section 6C, a fifth part 5A-2 formed at the position of the outer groove 6-4, and a sixth part 5A-3 formed on a bank 8B (refer to FIGS. 2 and 3) positioned further outside the fifth part 5A-2. And the fifth part 5A-2 being the regions 5A-21 to 5A-25 is configured in a state in which the fifth part 5A-2 becomes like a bridge between the above-mentioned fourth part 5A-1 and the sixth part 5A-3.

Incidentally, the ground electrode 5 composed of the above-mentioned first and second electrode portions 5A and 5B are formed in the same process as the signal electrode 4. And the height of the ground electrode itself of the second part 5B-2 can be almost the same height of the first part 5B-1 and the third part 5B-3.

In this, when each of the widths of the first ridge section 6A and the second ridge section 6B is made equal to 20 μm or less, the driving voltage supplied to the signal electrode 4, in the case where an optical modulator is composed of the optical device 1, can be reduced effectively. However, in the case where the width is narrow, instability caused by the difference of thermal expansion, between the signal electrode 4 and the ground electrode 5 and between the signal electrode 4 and the substrate 2, is increased.

On the other hand, in the first embodiment, as shown in FIGS. 1 to 3, the ground electrode portion at the position of the outer groove 6-3 is not formed in a state in which the outer groove 6-3 is buried by the ground electrode portion thoroughly. That is, the ground electrode portion is formed in the plurality of regions 5B-21 to 5B-25 separately. Therefore, the ground electrode portion for the straight line waveguide 3b-2 can be the first part 5B-1 whose width is narrower than that of the second ridge section 6B. That is, the width of the first part 5B-1 is equal to approximately the width of the signal electrode 4+5 μm or less.

By this structure, a stress that the signal electrode 4 applies to the straight line waveguide 3b-1 and a stress that the first part 5B-1 being a part of the ground electrode 5 applies to the straight line waveguide 3b-2 can be made almost the same level. As mentioned above, when the stresses applying to the straight line waveguides 3b-1 and 3b-2 are made almost the same level, the temperature characteristic of the bias voltage, in the case where the optical device is used as an optical modulator, can be improved.

Figure 13:
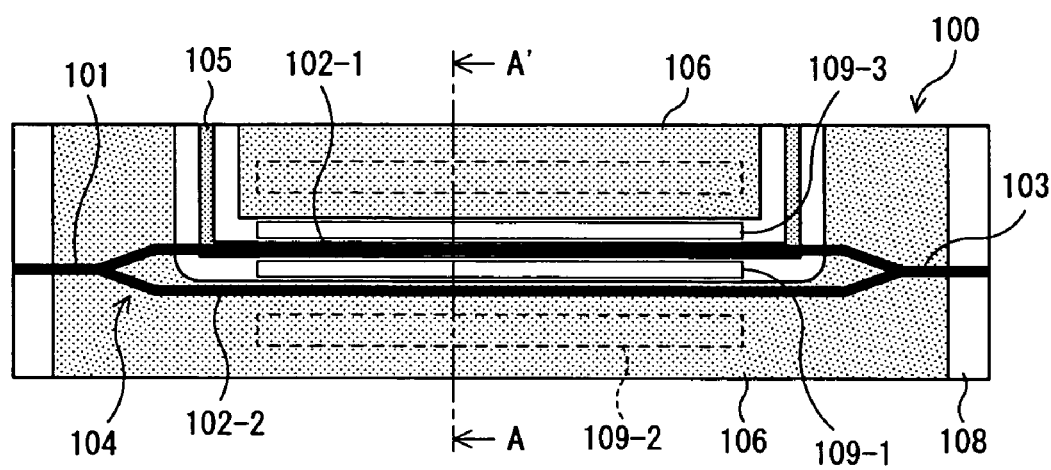
FIG. 13 is a schematic plane view showing an optical device that is used as an optical control device.

Furthermore, as mentioned above, in the case where the first part 5B-1 was made narrow, it is supposed that the high frequency characteristic of the modulation frequency is deteriorated compared with the optical device shown in FIG. 13. Therefore, on the bank 8A outside the first part 5B-1, a wider ground electrode portion is disposed as the third part 5B-3, and the first part 5B-1 and the third part 5B-3 are electrically connected to each other via the plural regions 5B-21 to 5B-25 being the second part 5B-2 at the position of the groove 6-3, and the high frequency characteristic of the modulation frequency is prevented from deteriorating.

Since the second ground electrode potion 5B is composed of the plural regions 5B-21 to 5B-25 at the position of the outer groove 6-3, the influence of the stress applying on the second ridge section 6B in which the straight line waveguide 3b-2 is formed is made minimum, and also the broad band of the modulation frequency can be secured.

In this, the width of each of the plural regions 5B-21 to 5B-25 (or the plural regions 5A-21 to 5A-25) is preferably 3 μm to 20 μm approximately. With this, its disconnection can be prevented and the stress applying on the ridge section 6B (6C) can be made small sufficiently.

And when the interval between two of the plural regions 5B-21 to 5B-25 (or the plural regions 5A-21 to 5A-25) is made equal to approximately 10 μm or more, the temperature dependency of the change of the bias voltage can be improved effectively. And when the interval is made equal to approximately 5 mm or less, the broad band of the modulation frequency can be secured. Therefore, the interval between two of the plural regions 5B-21 to 5B-25 (or the plural regions 5A-21 to 5A-25) is made equal to approximately 10 μm or more, and equal to approximately 5 mm or less preferably.

Further, the width w2 of the first ridge section 6A in which the straight line waveguide 3b-1 is formed, and the width w1 of the second ridge section 6B in which the straight line waveguide 3b-2 is formed are made almost equal (w1≈w2). And the relative position relation between the first ridge section 6A and the signal electrode 4 and the relative position relation between the second ridge section 6B and the first part 5B-1 are made almost equal. By this structure, the stress applying on the straight line waveguide 3b-1 from the signal electrode 4 and the stress applying on the straight line waveguide 3b-2 from the first part 5B-1 being a part of the ground electrode portion are made almost equal. With this, the temperature characteristic can be improved further. Actually, as shown in X1 of FIG. 2, the center of the signal electrode 4 is made equal to the center of the first ridge section 6A, and also as shown in X2 of FIG. 2, the center of the first part 5B-1 being a part of the ground electrode 5 is made equal to the center of the second ridge section 6B.

And also, by making the thickness of the first part 5B-1 and the thickness of the signal electrode 4 equal, similarly to the above-mentioned case, the stress applying on the straight line waveguide 3b-1 from the signal electrode 4 and the stress applying on the straight line waveguide 3b-2 from the first part 5B-1 being a part of the ground electrode portion can be made almost equal. With this, the temperature characteristic can be improved further.

[A1-2] Operation and Effects of Optical Device 1 according to First Embodiment

In the optical device 1 having the above-mentioned structure, light inputted to the Y branching waveguide 3a at the light input side is transmitted in a state of being branched into the two straight line waveguides 3b-1 and 3b-2. And the light transmitting through each of the two straight line waveguides 3b-1 and 3b-2 changes its refractive index, by the interaction with the electric field applied by the cooperation of the signal electrode 4 and the ground electrode 5. And the light transmitted through each of the two straight line waveguides 3b-1 and 3b-2 is put together at the Y branching waveguide 3c at the light output side and outputted.

And by controlling the electric field applying to the two straight line waveguides 3b-1 and 3b-2 by the signal electrode 4 and the ground electrode 5, the inputted light is controlled (for example, data modulation is executed).

At this time, in the first embodiment, the following structure is adopted. That is, the ratio of the volume of the second part 5B-2 being a part of the ground electrode portion formed at the position of the outer groove 6-3 to the area of the opening part of the outer groove 6-3 is smaller than the ratio of the volume to the area of the first part 5B-1 or the third part 5B-3 being a part of the ground electrode portion formed at the position except the outer groove 6-3. Therefore, the stress applying on the second ridge section 6B can be sufficiently restrained and the light transmitting through the straight line waveguides 3b-1 and 3b-2 can be stabilized.

That is, the second part 5B-2 becoming the ground electrode portion at the position of the outer groove 6-3 adjacent to the outside of the second ridge section 6B is formed by separating into the plural regions 5B-21 to 5B-25. Therefore, the second part 5B-2 can be a ground electrode pattern that can restrain the stress on the second ridge section 6B sufficiently. Especially, the width of the first part 5B-1 can be a narrow width (in this case, the width of the signal electrode 4+5 μm) that can restrain the stress sufficiently. With this, by decreasing the stress on the second ridge section 6B, the change of the refractive index by the electric field control for the light transmitting through the straight line waveguides 3b-1 and 3b-2 can be stabilized.

Figure 14:
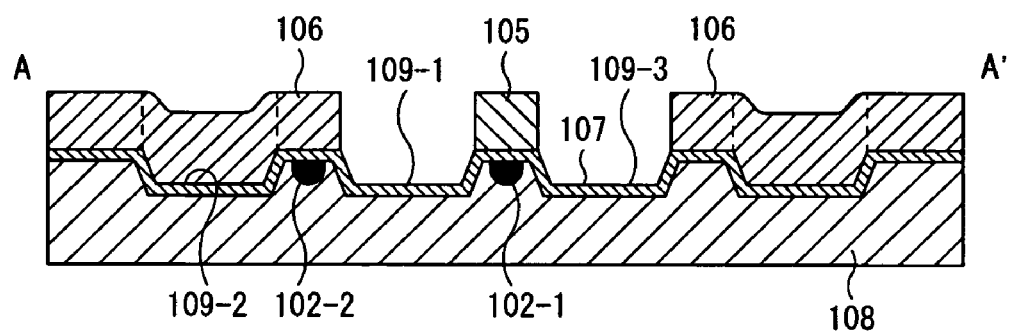
FIG. 14 is a sectional view of the optical device shown in FIG. 13 when seen in the direction of arrows A and A'.
Figure 15:
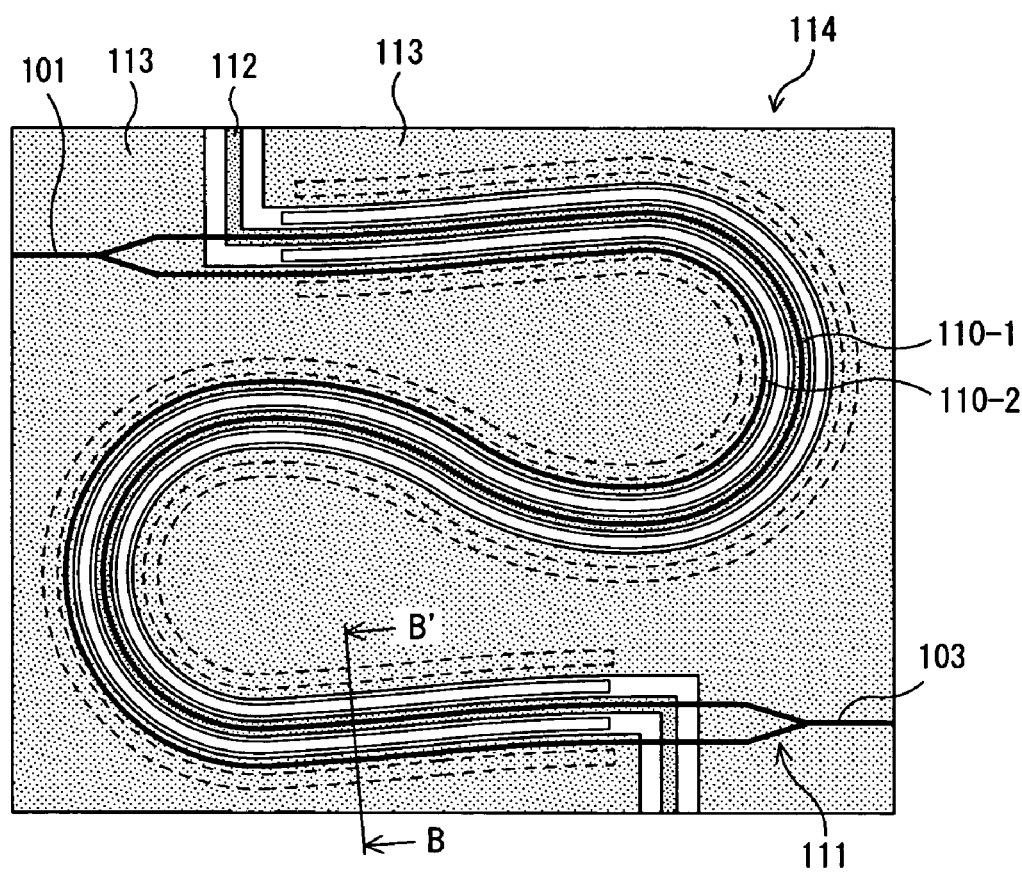
FIG. 15 is a schematic plane view showing an optical device that is used as an optical control device.
Figure 16:
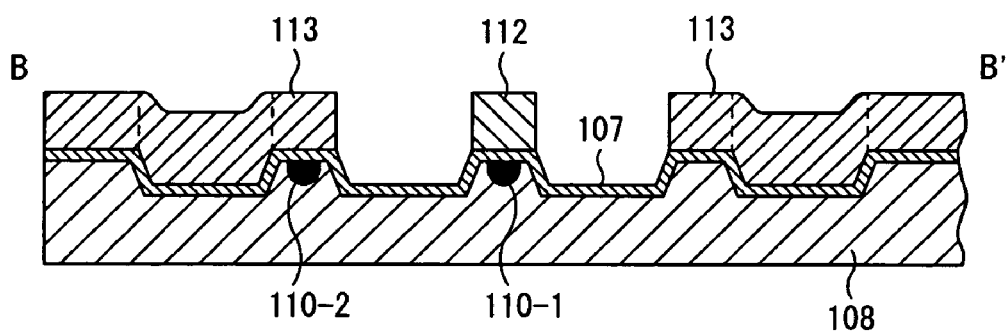
FIG. 16 is a sectional view of the optical device shown in FIG. 15 when seen in the direction of arrows B and B'.
Figure 17:
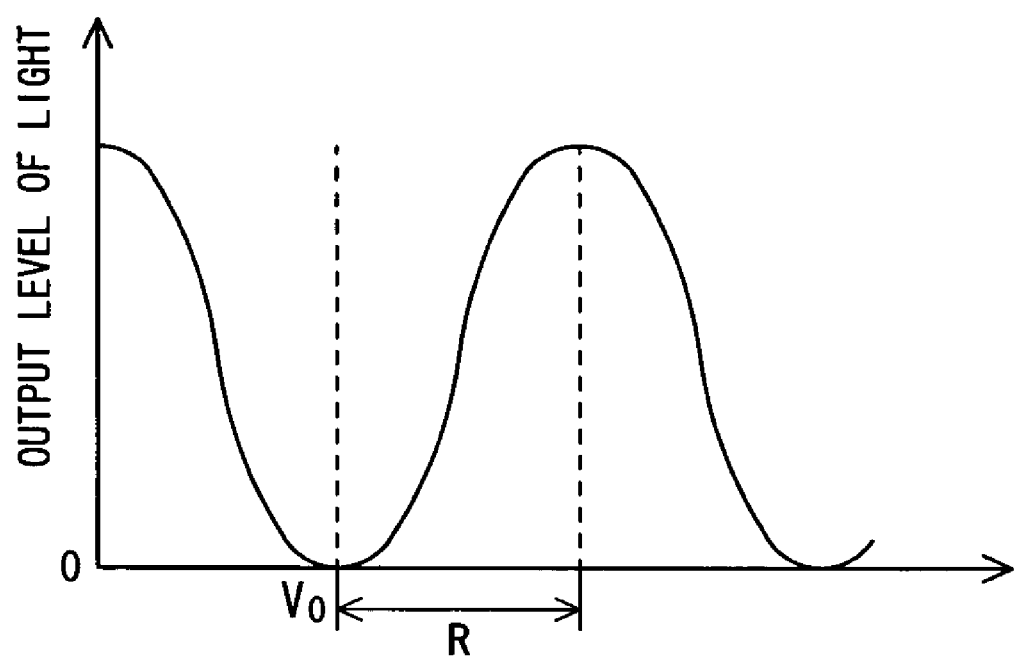
FIG. 17 is a graph for explaining a technical problem to be solved by the present invention.

That is, as mentioned above, the stress on the second ridge section 6B can be restrained, compared with the optical device shown in FIGS. 13 and 14. Therefore, for example, as shown in FIG. 4, the temperature dependency of the bias voltage applying to the operating point, for controlling the light by applying the bias voltage to the signal electrode 4, can be restrained largely, compared with the optical device shown in FIGS. 13 and 14.

Figure 4:
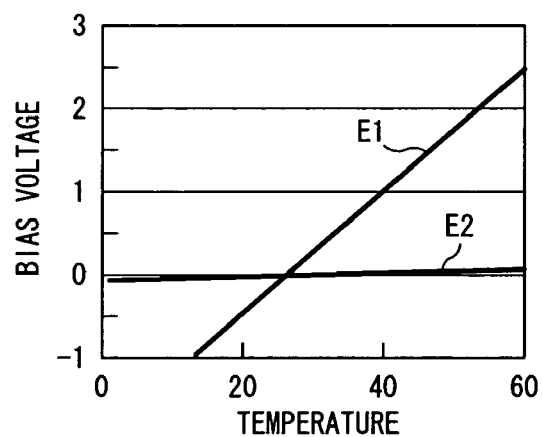
FIG. 4 is a graph for explaining an effect of the optical device of the present invention.

Actually, the temperature dependency of the bias voltage of the optical device 100 shown in FIGS. 13 and 14 is, for example, E1 in FIG. 4. On the other hand, the bias voltage of the optical device 1 according to the first embodiment is, for example, E2 in FIG. 4, in which the change of the bias voltage for the temperature is reduced almost to zero. With this, the temperature dependency of the bias voltage can be decreased largely.

Further, by this second part 5B-2, the first part 5B-1 being the ground electrode portion on the second ridge section 6B is electrically connected to the third part 5B-3 being the ground electrode portion formed on the substrate region further outside the outer groove 6-3, with this, the ground electric potential at the second electrode portion 5B can be stabilized. Therefore, the change of the electric field to be applied to the straight line waveguides 3b-1 and 3b-2 being the optical waveguides for the voltage to be applied by the signal electrode 4 and the ground electrode 5 can be stabilized. And in the case where the optical device 1 is used as the optical modulator, the broad band of the modulation frequency can be realized.

And the forming pattern of the first and second ridge sections 6A and 6B and the ridge section 6C, and the banks 8A and 8B is made into a symmetric shape with respect to the first ridge section 6A. And also the pattern in the interaction regions (both side regions of the straight line waveguides 3b-1 and 3b-2) of the first electrode portion 5A and the second electrode portion 5B, of which the ground electrode 5 is composed, is formed in symmetry with respect to the first ridge section 6A above which the signal electrode 4 is formed. Therefore, the stress applying on each part of the whole substrate is made almost equal, and the temperature characteristic can be improved further.

As mentioned above, in the structure of the optical device 1 according to the first embodiment of the present invention, the ratio of the volume of the second part 5B-2 formed at the position of the outer groove 6-3 to the area of the opening part of the outer groove 6-3 is smaller than the ratio of the volume to the area of the first part 5B-1 or the third part 5B-3 formed at the position except the outer groove 6-3. Therefore, there is an advantage that the stress on the second ridge section 6B can be restrained.

[A2] Explanation of Modified Example of First Embodiment

In the optical device 1 according to the first embodiment, as the ground electrode portions at the positions of the outer grooves 6-3 and 6-4, the ground electrode portions are separated in the plural regions 5B-21 to 5B-25 and 5A-21 to 5A-25 respectively. However, according to the present invention, ridge sections (outer ridge sections) outside the ridge sections 6B and 6C can be formed at the positions of grooves formed further outside the outer grooves 6-3 and 6-4 on the substrate 2. In this case, at the positions of these additional grooves, a ground electrode having a structure similar to the structure, in which the plural regions 5B-21 to 5B-25 and 5A-21 to 5A-25 are disposed, can be formed. By this structure, an advantage similar to the first embodiment can be obtained and the stress applying on the substrate 2 can be reduced further as explained below.

Figure 5:
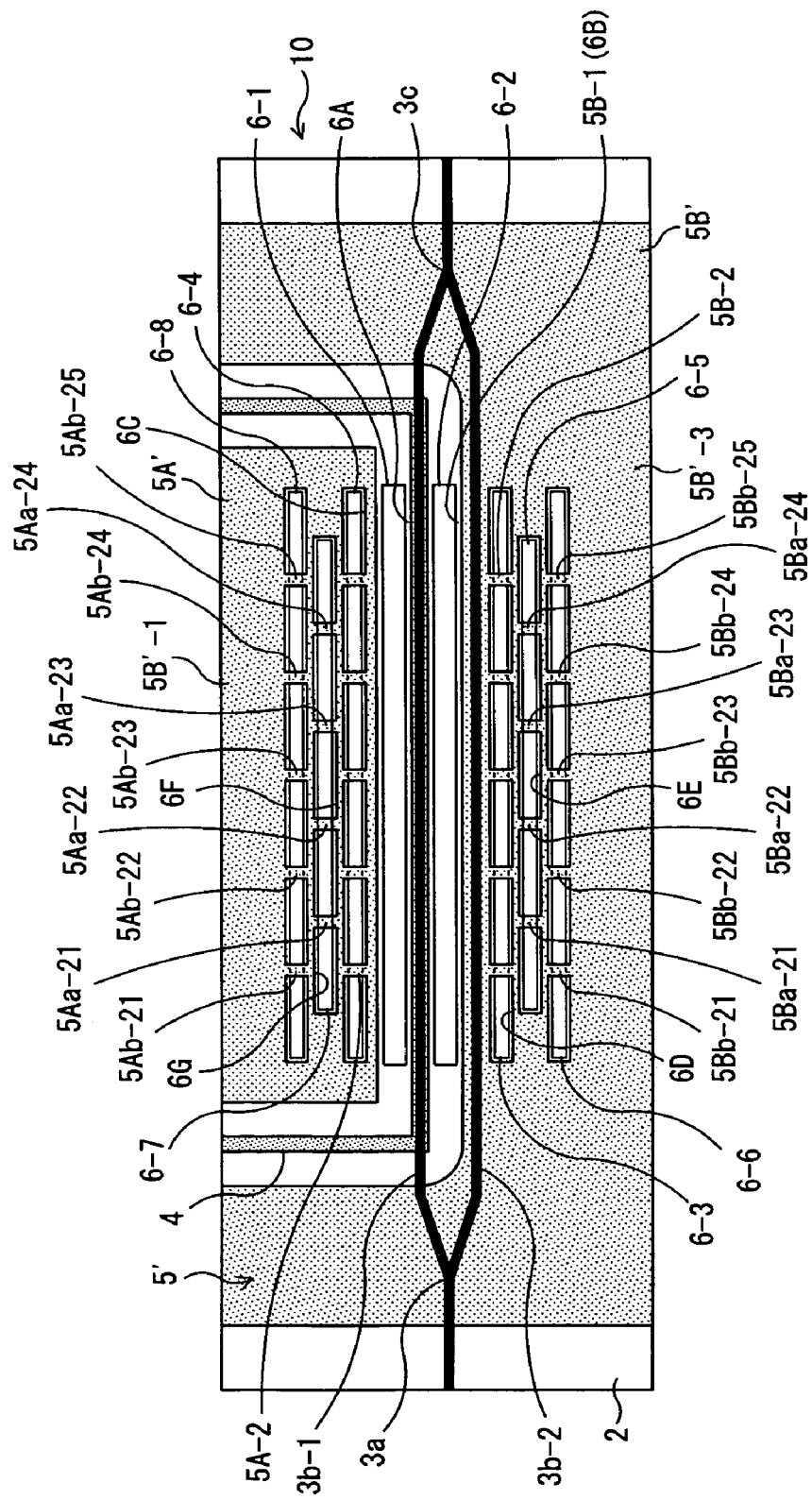
FIG. 5 is a schematic plane view showing an optical device according to a modified example of the first embodiment of the present invention.

For example, as shown in an optical device 10 of FIG. 5, two outer grooves 6-5 and 6-6 are formed in parallel outside the outer groove 6-3 and two outer ridge sections 6D and 6E are formed, and also two outer grooves 6-7 and 6-8 are formed in parallel outside the outer groove 6-4 and two outer ridge sections 6F and 6G are formed. In this case, the structure of the ground electrode portion at the position of each of the outer grooves 6-5 to 6-8 can be a structure similar to the second part 5B-2 at the position of the above-mentioned outer groove 6-3 and a ground electrode 5' can be formed. In the optical device 10 shown in FIG. 5, at the position of the outer groove 6-5, a ground electrode portion that was separated into four regions 5Ba-21 to 5Ba-24 is formed, and at the position of the outer groove 6-6, a ground electrode portion that was separated into five regions 5Bb-21 to 5Bb-25 is formed. Further, at the position of the outer groove 6-7, a ground electrode portion that was separated into four regions 5Aa-21 to 5Aa-24 is formed, and at the position of the outer groove 6-8, a ground electrode portion that was separated into five regions 5Ab-21 to 5Ab-25 is formed. In this, in FIG. 5, the same reference number as that in FIGS. 1 to 3 shows almost the same portion.

At this time, when the second part 5B-2 formed at the position of the outer groove 6-3 and the ground electrode portions formed at the positions of the outer grooves 6-5 and 6-6 outside the outer groove 6-3 are observed, the ground electrode portions at the positions of the outer grooves 6-3, 6-5, and 6-6 being adjacent to each other via the ridge sections 6D and 6E are formed by different patterns from each other. That is, the regions 5B-21 to 5B-25, the regions 5Ba-21 to 5Ba-24, and the regions 5Bb-21 to 5Bb-25 are formed so that they are distributed at the different positions with the long length direction of the grooves being its reference. With this, the influence of the difference of the thermal expansion between the ground electrode 5' and the substrate 2 becomes smaller, therefore, the stress applying on each of the ridge sections 6A to 6G can be restrained effectively.

In this case, the second ridge section 6B and the outer ridge sections 6C to 6G are formed at the positions being symmetry in the number with respect to the first ridge section 6A formed on the substrate 2. And also the pattern in the interaction regions (both side regions of the straight line waveguides 3b-1 and 3b-2) of a first electrode portion 5A' and a second electrode portion 5B', of which the ground electrode 5' is composed, is formed in symmetry for the first ridge section 6A above which the signal electrode 4 is formed. Therefore, the stress applying on each part of the whole substrate is made almost equal, and the temperature characteristic can be improved further.

[B] Explanation of Second Embodiment

[B-1] Structure of Optical Device 20 according to Second Embodiment

Figure 6:
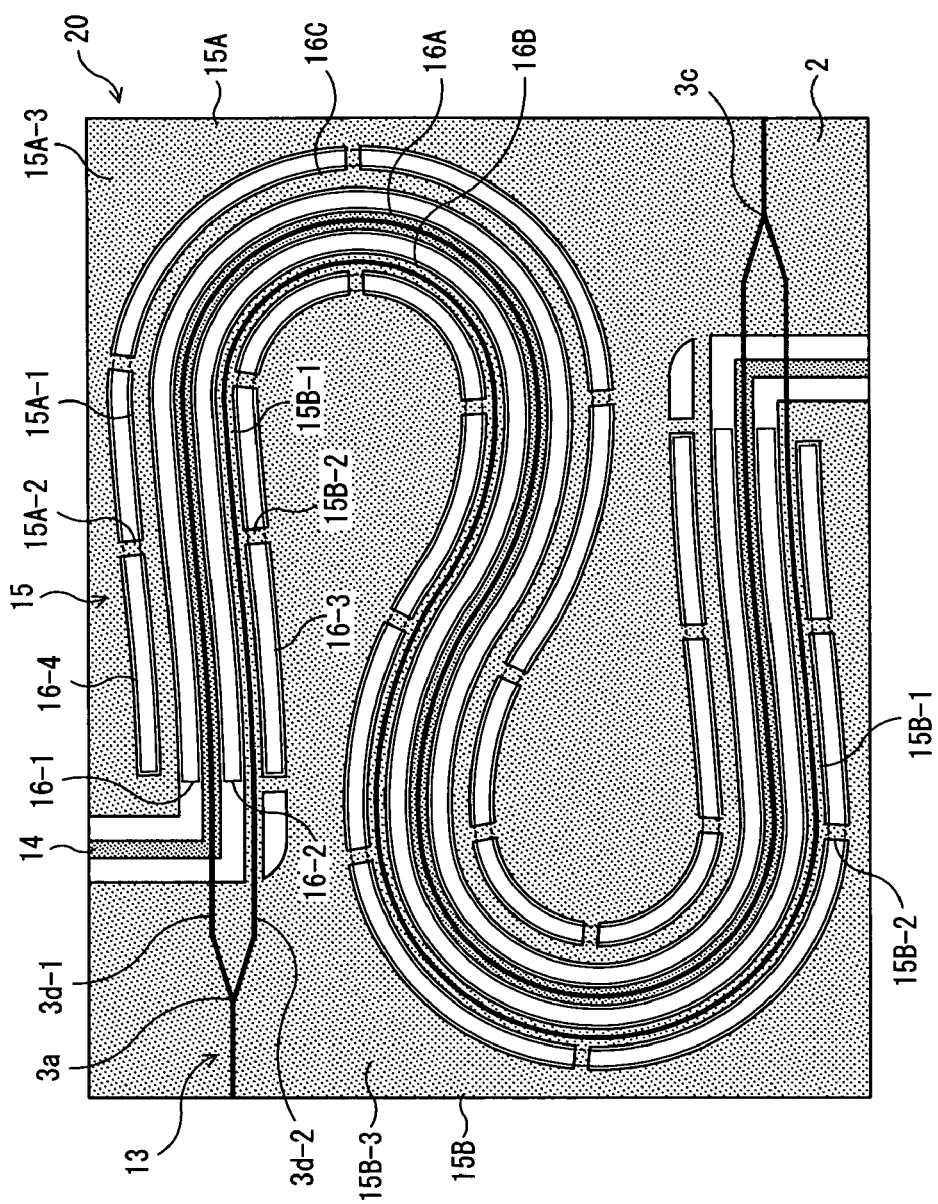
FIG. 6 is a schematic plane view showing an optical device according to a second embodiment of the present invention.

FIG. 6 is a schematic plane view showing an optical device 20 according to a second embodiment of the present invention. The optical device 20 shown in FIG. 6, compared with the optical device 1 according to the first embodiment or the optical device 10 according to the modified example of the first embodiment, in the interaction regions, instead of the straight line waveguides 3b-1 and 3b-2, comprises a Mach-Zehnder type optical waveguide 13 having curved waveguides (first and second optical waveguides) 3d-1 and 3d-2, which have a curve of at least 90 degrees or more. Further, the optical device 20 comprises a signal electrode 14 and a ground electrode 15 having a pattern corresponding to a pattern of the curved waveguides 3d-1 and 3d-2. Above-mentioned points are different from the first embodiment. In this, in FIG. 6, the same reference number as that in FIGS. 1 to 3 shows almost the same portion.

That is, the signal electrode 14 is formed above the curved waveguide 3d-1 and the ground electrode 15 is formed in a pattern that sandwiches the signal electrode 14 having a predetermined gap between the signal electrode 14 and the ground electrode 15. The optical device 20, in which the curved waveguides 3d-1 and 3d-2 were formed, compared with the optical device 1 or 10, in which the straight line waveguides 3b-1 and 3b-2 were formed, the area of the substrate 2 can be made smaller, therefore, the structure of the optical device can be made compact.

And also, in the optical device 20 according to the second embodiment, by inner grooves 16-1 and 16-2 formed at both sides of the curved waveguide 3d-1 being apart of the interaction regions, this curved waveguide 3d-1 can be made into a ridge waveguide. And by the inner groove 16-2 and an outer groove 16-3 formed at both sides of the curved waveguide 3d-2, this curved waveguide 3d-2 can be made into a ridge waveguide. By the curved waveguides 3d-1 and 3d-2 having the ridge waveguide structure, compared with a curved waveguide formed on a flat substrate, the shutting effect of transmitting light can be improved.

In other words, the curved waveguide 3d-1 is formed in a first ridge section 16A being sandwiched between the inner grooves 16-1 and 16-2, and the curved waveguide 3d-2 is formed in a second ridge section 16B being sandwiched between the inner groove 16-2 and the outer groove 16-3. In this, the reference number 16C is an outer ridge section being sandwiched between the inner groove 16-1 and an outer groove 16-4.

And the ground electrode 15 comprises a first electrode portion 15A that was formed at the opposite side of the curved waveguide 3d-2 with respect to the curved waveguide 3*d*-1 above which the signal electrode 14 was formed, and a second electrode portion 15B formed at the side of the curved waveguide 3*d*-2. And the ground electrode 15 has been formed by sandwiching the signal electrode 14 between the first and second electrode portions 15A and 15B having a predetermined gap between the signal electrode 14 and the first and second electrode portions 15A and 15B. In these first and second electrode portions 15A and 15B, specific forming patterns of the present invention, corresponding to the ground electrode 5 in the first embodiment, are included.

That is, the second electrode portion 15B being a part of the ground electrode 15 comprises a first part 15B-1 formed on the second ridge section 16B, a second part 15B-2 formed at the position of the outer groove 16-3, and a third part 15B-3 formed outside the second part 15B-2. And in the structure of the second part 15B-2 formed at the position of the outer groove 16-3, the ratio of the volume of the ground electrode portion formed at the position of the outer groove 16-3 to the area of the opening part of the outer groove 16-3 is smaller than the ratio of the volume to the area of the ground electrode portion being the first part 15B-1 or the third part 15B-3 formed at the position except the outer groove 16-3.

Actually, at the second electrode portion 15B, similar to the second part 5B-2 in the first embodiment, the ground electrode portion formed at the position of the outer groove 16-3 is formed in a plurality of regions separately at the position of the outer groove 16-3 (10 regions in FIG. 6). And also, at the first electrode portion 15A, similar to the fifth part 5A-2 in the first embodiment, the ground electrode portion formed at the position of the outer groove 16-4 is formed in a plurality of regions separately at the position of the outer groove 16-4 (5 regions in FIG. 6).

[B-2] Operation and Effects of Optical Device 20 according to Second Embodiment In the optical device 20 having the above-mentioned structure, light inputted to the Y branching waveguide 3*a* at the light input side is transmitted in a state of being branched into the two curved waveguides 3*d*-1 and 3*d*-2. And the light transmitting through each of the two curved waveguides 3*d*-1 and 3*d*-2 changes its refractive index, by the interaction with the electric field applied by the cooperation of the signal electrode 14 and the ground electrode 15. And the light transmitted through each of the two curved waveguides 3*d*-1 and 3*d*-2 is put together at the Y branching waveguide 3*c* at the light output side and outputted.

At this time, in the second embodiment, the second part 15B-2 becoming the ground electrode portion at the position of the outer groove 16-3 adjacent to the outside of the second ridge section 16B is formed by separating into the plural regions. Therefore, the second part 15B-2 can be a ground electrode pattern that can restrain the stress on the second ridge section 16B sufficiently. Especially, the width of the first part 15B-1 can be a narrow width (in this case, the width of the signal electrode 14+5 μm) that can restrain the stress sufficiently. With this, by decreasing the stress on the second ridge section 16B, the change of the refractive index of the light transmitting through the curved waveguides 3*d*-1 and 3*d*-2 can be stabilized.

As mentioned above, the optical device 20 according to the second embodiment of the present invention has the advantage similar to that in the case of the first embodiment. Further, at the optical device 20, since the curved waveguides 3*d*-1 and 3*d*-2 have been formed, compared with the optical device 1 or 10, in which the straight line waveguides 3*b*-1 and 3*b*-2 were formed, the area of the substrate 2 can be made smaller, therefore, the structure of the optical device can be made compact.

[C] Explanation of Third Embodiment

[C-1] Structure of Optical Device 30 according to Third Embodiment

Figure 7:
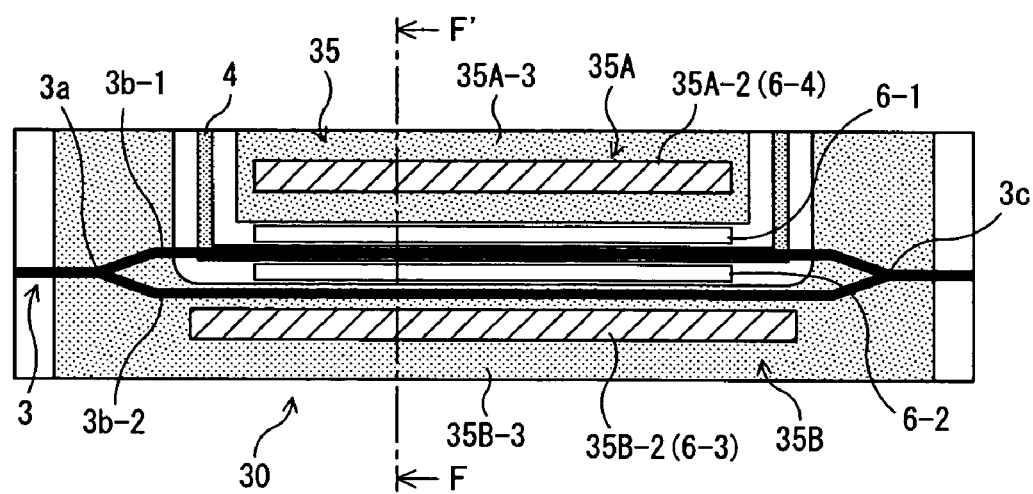
FIG. 7 is a schematic plane view showing an optical device according to a third embodiment of the present invention.
Figure 8:
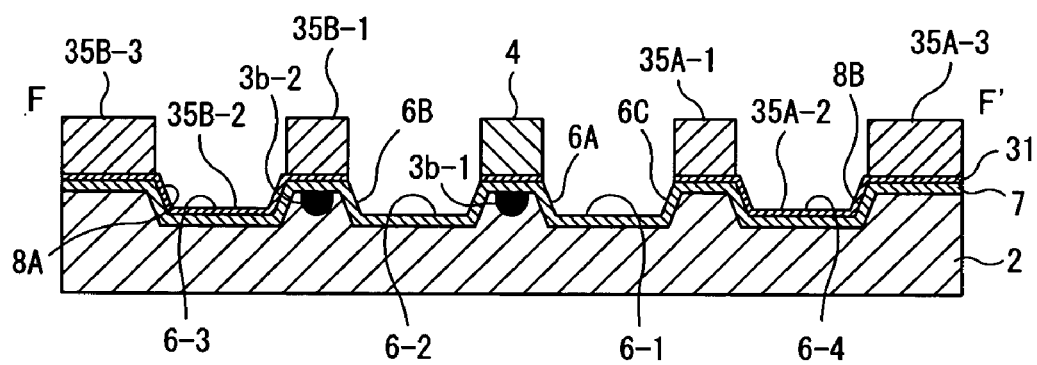
FIG. 8 is a sectional view of the optical device shown in FIG. 7 when seen in the direction of arrows F and F'.

FIG. 7 is a schematic plane view showing an optical device 30 according to a third embodiment of the present invention. FIG. 8 is a sectional view of the optical device 30 shown in FIG. 7 when seen in the direction of arrows F and F'. In the optical device 30 according to the third embodiment, compared with the optical device 1 according to the first embodiment, a forming pattern of a ground electrode 35 is different. In this, the structure except the ground electrode 35 is basically the same as the optical device 1 in the first embodiment, and in FIGS. 7 and 8, the same reference number as that in FIGS. 1 to 3 shows almost the same portion.

The ground electrode 35 comprises a first electrode portion 35A and a second electrode portion 35B, which were formed so as to sandwich the signal electrode 4 with a predetermined gap between the signal electrode 4 and each of the first electrode portion 35A and the second electrode portion 35B. In this, the first electrode portion 35A is formed at the opposite side of the straight line waveguide 3*b*-2 with respect to the side of the straight line waveguide 3*b*-1 above which the signal electrode 4 was formed, and the second electrode portion 35B is formed at the side of the straight line waveguide 3*b*-2. In the portions relating to these first and second electrode portions 35A and 35B, specific forming patterns of the present invention are included.

That is, the second electrode portion 35B being a part of the ground electrode 35 comprises a first part 35B-1 formed on the ridge section 6B, a second part 35B-2 formed at the position of the outer groove 6-3, and a third part 35B-3 formed at the bank 8A (refer to FIG. 8) outside the second part 35B-2. And in this structure, the ratio of the volume of the ground electrode portion formed at the position of the outer groove 6-3 to the area of the opening part of the outer groove 6-3 is smaller than the ratio of the volume to the area of the ground electrode portion being the first part 35B-1 or the third part 35B-3 formed at the position except the outer groove 6-3.

Actually, the second part 35B-2 being a part of the ground electrode portion formed at the position of the outer groove 6-3 is formed by a conductive film being thinner than each of the first part 35B-1 and the third part 35B-3 being a part of the ground electrode portion formed at the positions except the outer groove 6-3. And the second part 35B-2 being the conductive film is formed, for example, on almost the whole surface of the outer groove 6-3. And the same material (for example, Au) of the first part 35B-1 or the third part 35B-3 being a part of the ground electrode portion can be used for the second part 35B-2.

And the thickness of the conductive film of the second part 35B-2 is, for example, is a thickness that prevents the influence of the stress on the second ridge section 6B from occurring, and can be approximately 1 μm or less.

And also the first electrode portion 35A being a part of the ground electrode 35 has a specific structure corresponding to the second electrode portion 35B. That is, the first electrode portion 35A comprises a fourth part 35A-1 formed on the ridge section 6C, a fifth part 35A-2 formed at the position of the outer groove 6-4, and a sixth part 35A-3 formed at the bank 8B (refer to FIG. 8) outside the outer groove 6-4. And in this structure, the fifth part 35A-2 being a part of the ground electrode portion formed at the position of the outer groove 6-4 is formed by a conductive film being thinner than each of the fourth part 35A-1 and the sixth part 35A-3 being a part of the ground electrode portion formed at the positions except the outer groove 6-4. And the thickness of fifth part 35A-2 can be a thickness of approximately 1 μm or less, which prevents the influence of the stress on the ridge section 6C from affecting the whole substrate.

[C-2] Explanation of Manufacturing Processes of Optical Device 30 according to Third Embodiment The above-mentioned optical device 30 can be manufactured by processes shown in, for example, FIGS. 9(a) to 9(f). In this, FIGS. 9(a) to 9(f) are sectional views of manufacturing processes of the optical device 30 when seen in the direction of arrows F and F' in FIG. 7. And FIG. 9 (f) is the sectional view of the optical device 30 at the time of its completion (refer to FIG. 8).

Figure 9A:
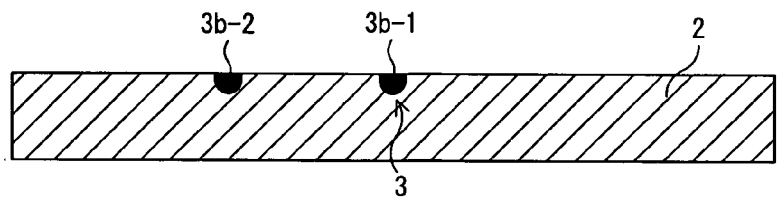
FIGS. 9(*a*) to 9(*f*) are sectional views showing manufacturing processes of the optical device according to the third embodiment of the present.
Figure 9B:
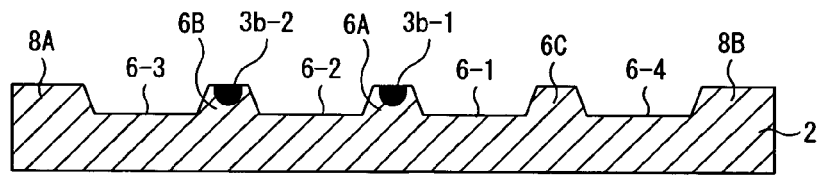

First, as shown in FIG. 9(a), a Mach-Zehnder type optical waveguide 3 is formed in a substrate 2, by the titanium diffusion or the proton exchange.

Next, as shown in FIG. 9 (b), inner grooves 6-1 and 6-2, and outer grooves 6-3 and 6-4 are formed by using a technology such as an etching technology. At this time, a section including a straight line waveguide 3b-1, which was sandwiched between the inner grooves 6-1 and 6-2, is made into a first ridge section 6A. And also, a section including a straight line waveguide 3b-2, which was sandwiched between the inner grooves 6-2 and the outer groove 6-3, is made into a second ridge section 6B. Further, a section sandwiched between the inner groove 6-1 and the outer groove 6-4 becomes a ridge section 6C. In this, an edge part further outside the outer groove 6-3 is a bank 8A, and an edge part further outside the outer groove 6-4 is a bank 8B. And the inner grooves 6-1 and 6-2 and the outer grooves 6-3 and 6-4 are formed in symmetry with respect to the first ridge section 6A.

Figure 9C:
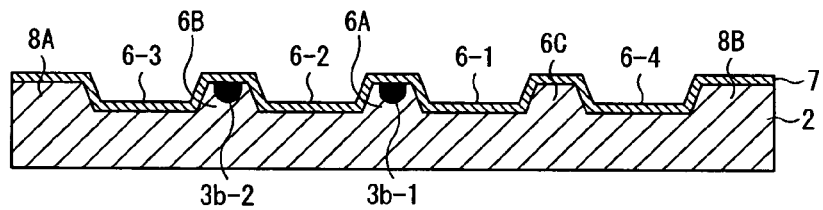
Figure 9D:
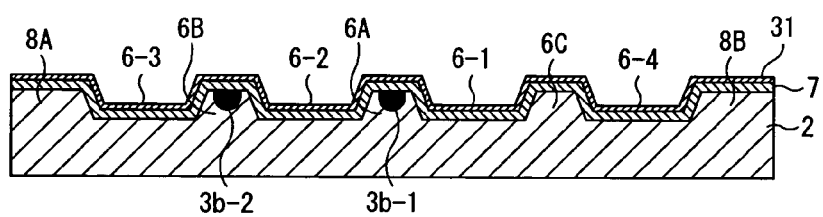

After the ridge sections 6A to 6C were formed by forming the inner grooves 6-1 and 6-2 and the outer grooves 6-3 and 6-4, as shown in FIG. 9(c), a buffer layer 7 (for example, $SiO_2$) is formed on the surface of the substrate 2. Further, as shown in FIG. 9(d), as a pre-process for forming a thick film (refer to FIG. 9(f)) becoming a signal electrode 4 and a ground electrode 35 at an later process, a thin film 31 of Ti or Au having the thickness of approximately 1 μm or less is formed on the surface of the substrate 2 by the deposition.

Figure 9E:
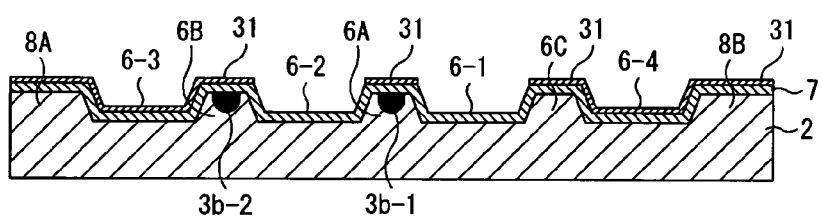
Figure 9F:
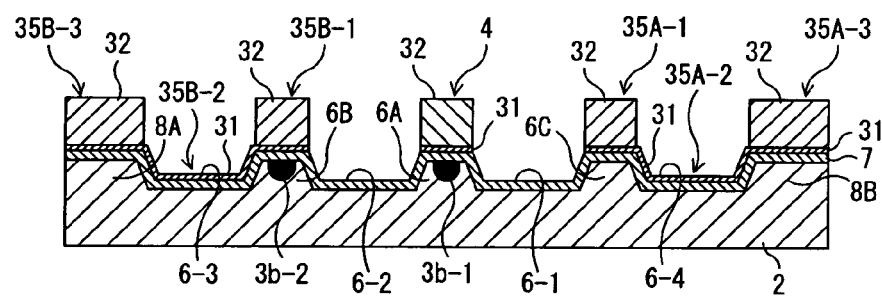

And as shown in FIG. 9(e), a part of the thin film 31 of Ti or Au formed on the surface of the substrate 2 by the deposition, formed at the inner grooves 6-1 and 6-2 where the signal electrode 4 and the ground electrode 35 are not formed, is removed by etching. And last, as shown in FIG. 9(f), an Au plating thick film 32 becoming the signal electrode 4 and the ground electrode 35 is formed corresponding to patterns of the signal electrode 4, a first part 35B-1 and a third part 35B-3 of a second electrode portion 35B and a fourth part 35A-1 and a sixth part 35A-3 of a first electrode portion 35A.

In this, the thin film 31 of Ti or Au disposed between the Au plating thick film 32 and the substrate 2 is a thin film having conductivity. Therefore, by integrating the thin film 31 of Ti or Au together with the Au plating thick film 32 formed by the pattern of the first part 35B-1, the first part 35B-1 being a part of the ground electrode portion is formed. Similar to this, by integrating the thin film 31 of Ti or Au together with the Au plating thick film 32, the third part 35B-3, the fourth part 35A-1, and the sixth part 35A-3 are formed.

And, at the position of the outer groove 6-3, only the thin film 31 of Ti or Au was formed without forming the Au plating thick film 32, and the thin film 31 of Ti or Au is a thin film having conductivity. Therefore, the thin film 31 of Ti or Au is made into the second part 35B-2 being a part of the ground electrode portion, and the first part 35B-1 and the third part 35B-3 can be electrically connected to each other. Similar to this, the thin film 31 of Ti or Au at the position of the outer groove 6-4 is made into the fifth part 35A-2 being a part of the ground electrode portion, the fourth part 35A-1 and the sixth part 35A-3 can be electrically connected to each other.

In other words, the first part 35B-1 and the third part 35B-3 being parts of the ground electrode portion formed at the positions except the outer groove 6-3 are formed by the thin film 31 of Ti or Au, which is the conductive thin film section formed integrally together with the conductive thin film section at the position of the outer groove 6-3, and the Au plated thick film 32 being the conductive thick film section formed on the thin film 310f Ti or Au being the conductive thin film section.

Similar to this, the fourth part 35A-1 and the sixth part 35A-3 being parts of the ground electrode portion formed at the positions except the outer groove 6-4 are formed by the thin film 31 of Ti or Au, which is the conductive thin film section formed integrally together with the conductive thin film section at the position of the outer groove 6-3, and the Au plated thick film 32 being the conductive thick film section formed on the thin film 31 of Ti or Au being the conductive thin film section.

[C-3] Operation and Effects of Optical Device 30 according to Third Embodiment

In the optical device 30 having the above-mentioned structure, similar to the optical device 1 shown in FIGS. 1 to 3, light inputted to the Y branching waveguide 3a at the light input side is transmitted in a state of being branched into the two straight line waveguides 3b-1 and 3b-2. And the light transmitting through each of the two straight line waveguides 3b-1 and 3b-2 changes its refractive index, by the interaction with the electric field applying to the signal electrode 4. And the light transmitted through each of the two straight line waveguides 3b-1 and 3b-2 is put together at the Y branching waveguide 3c at the light output side and outputted.

At this time, in the third embodiment, the second part 35B-2 becoming the ground electrode portion at the position of the outer groove 6-3 adjacent to the outside of the second ridge section 6B is formed by the thin film 31 being a conductive film having the thickness of approximately 1 μm or less (refer to FIG. 9(f)). Therefore, the second part 35B-2 can be a ground electrode pattern that can restrain the stress on the second ridge section 6B sufficiently.

Especially, the width of the first part 35B-1, formed by the Au plated thick film 32 and the thin film 31, can be a narrow width (in this case, the width of the signal electrode 4+5 μm) that can restrain the stress sufficiently. With this, by decreasing the stress on the second ridge section 6B, the change of the refractive index of the light transmitting through the straight line waveguides 3b-1 and 3b-2 can be stabilized.

As mentioned above, in the optical device 30 according to the third embodiment of the present invention, the second part 35B-2, becoming the ground electrode portion at the position of the outer groove 6-3 adjacent to the outside of the second ridge section 6B, is formed by the thin film 31 being a conductive film having the thickness of approximately 1

μm or less (refer to FIG. 9(*f*)). Therefore, there is an advantage that the stress applying on the second ridge section 6B can be restrained.

In this, in the optical device 30 according to the third embodiment, as shown in FIG. 5, in the case where the grooves 6-5 to 6-8 are formed outside the grooves 6-1 to 6-4, in addition to the grooves 6-1 to 6-4, by making the grooves 6-5 to 6-8 into the ground electrode portions formed by only the thin film 31, the stress applying on the ridge sections 6D to 6G can be reduced.

[D] Explanation of Fourth Embodiment

Figure 10:
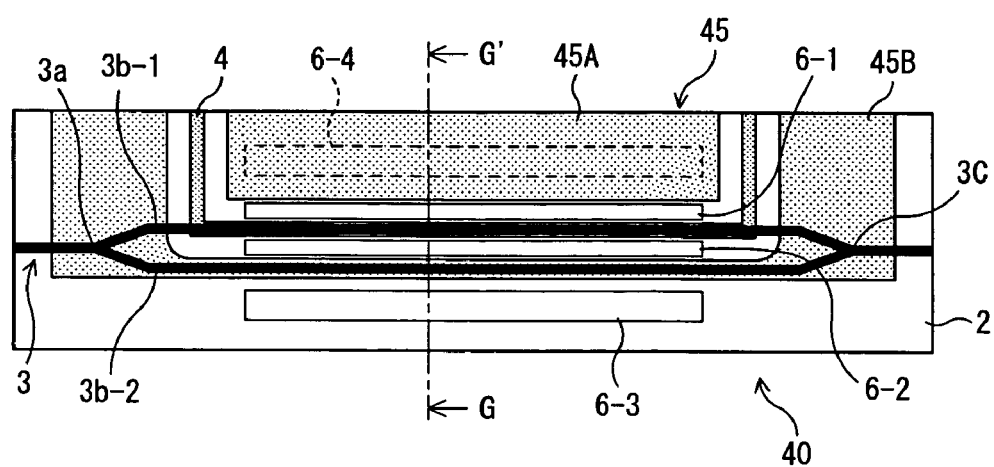
FIG. 10 is a schematic plane view showing an optical device according to a fourth embodiment of the present invention.
Figure 11:
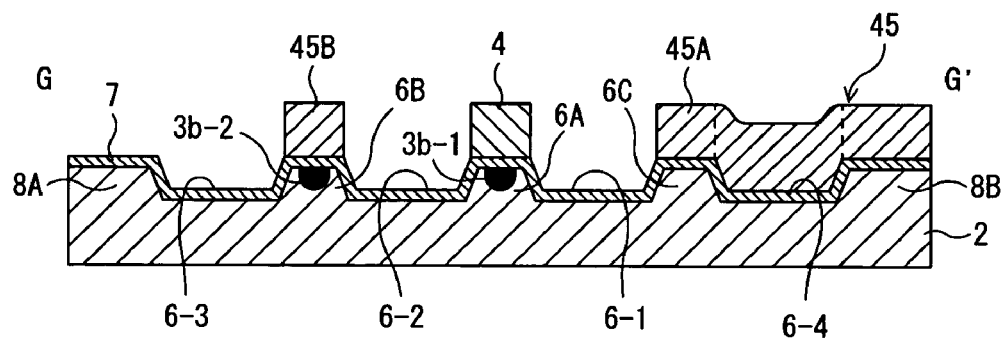
FIG. 11 is a sectional view of the optical device shown in FIG. 10 when seen in the direction of arrows G and G'.

FIG. 10 is a schematic plane view showing an optical device 40 according to a fourth embodiment of the present invention. FIG. 11 is a sectional view of the optical device 40 shown in FIG. 10 when seen in the direction of arrows G and G'. The optical device 40 according to the fourth embodiment, compared with the optical device 1 according to the first embodiment, has aground electrode 45 formed by a different pattern. In this, the structure except the ground electrode 45 is basically the same as the optical device 1 in the first embodiment, and in FIGS. 10 and 11, the same reference number as that in FIGS. 1 to 3 shows almost the same portion.

The ground electrode 45 comprises a first electrode portion 45A and a second electrode portion 45B, which were formed so as to sandwich the signal electrode 4 with a predetermined gap between the signal electrode 4 and each of the first electrode portion 45A, and between the signal electrode 4 and the second electrode portion 45B. In this, the first electrode portion 45A is formed at the opposite side of the straight line waveguide 3*b*-2 and at the side of the straight line waveguide 3*b*-1 above which the signal electrode 4 was formed, and the second electrode portion 45B is formed in a state in which a part of the second electrode portion 45B covers the straight line waveguide 3*b*-2.

In other words, the second electrode portion 45B of the optical device 40 was formed only on the second ridge section 6B in the interaction regions, and was not formed at the position of the outer groove 6-3 and the region outside the outer groove 6-3.

In the optical device 40 having the above-mentioned structure, since the ground electrode portion is not formed at the position of the outer groove 6-3, the difference between the width of the second electrode portion 45B and the width of the signal electrode 4 can be, for example, approximately 5 μm or less. With this, the stress on the second ridge section 6B can be restrained. Therefore, the temperature dependency of the bias voltage applying to the operating point at the time of controlling the light in the optical device 40 can be reduced.

Furthermore, the stresses applying on the first ridge section 6A and the second ridge section 6B are made almost equal to each other. Therefore, the difference of the refractive index of light transmitting through the two straight line waveguide 3*b*-1 and 3*b*-2, caused by the stresses on the first and second ridge sections 6A and 6B, can be made almost equal to each other. Consequently, the influence of the stresses on the first and second ridge sections 6A and 6B for the light outputting from the Y branching waveguide 3*c* at the light output side can be made minimum.

Therefore, according to the optical device 40 in the fourth embodiment, the difference between the width of the signal electrode 4 above the first ridge section 6A and the width of the ground electrode 45B above the second ridge section 6B is approximately 5 μm or less. Consequently, in an optical communication system that does not need the broadband of the modulation frequency, the temperature change of the bias voltage applying to the operating point can be restrained.

[E] Others

While the present invention has been described with reference to the particular illustrative embodiments, it is not to be restricted by those embodiments. And the art of the present invention can change or modify the embodiments without departing from the scope and spirit of the present invention.

In the above-mentioned first to third embodiments, the forming pattern of the ground electrode 5, 15, or 35 in the interaction regions is disposed in symmetry with respect to the signal electrode. However, according to the present invention, the structure of the ground electrode portion at the position of the outer groove 6-3 or 16-3 formed adjacent to the outside of the second ridge section 6B or 16B, above which the waveguide of the side where the ground electrode 5, 15, or 35 is formed in the two straight line waveguides 3*b*-1 and 3*b*-2 (curved waveguide 3*d*-1 and 3*d*-2) is formed, is the specific structure of the present invention. At this time, even when the ground electrode portion at the position of the other outer groove 6-4 is formed in a state shown in FIG. 13, at least the stress applying on the second ridge section 6B or 16B can be reduced. And in the optical device 1, 10, or 20 shown in FIGS. 1 to 3, FIG. 5, or FIG. 6, a supporting mechanism 51, 52, or 53, shown in FIG. 12(*a*), 12(*b*), or 12(*c*) for supporting the second part 5B-2, or 15B-2 being the ground electrode portion at the position of the outer groove 6-3 or 16-3, can be formed at the position forming the second part 5B-2, or 15B-2. With this structure, by using the supporting mechanism 51, 52, or 53, the second part 5B-2, or 15B-2 being the ground electrode portion does not touch the bottom section of the outer groove 6-3, or 16-3. By this, the disconnection of the second part 5B-2, or 15B-2 can be prevented.

Figure 12A:
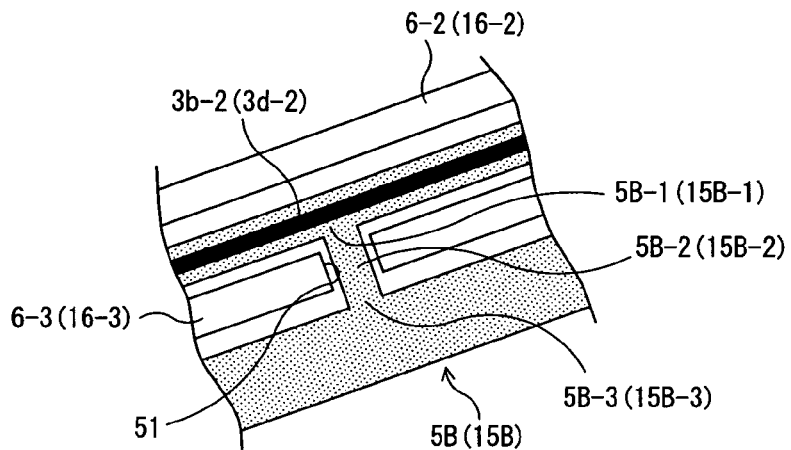
FIGS. 12(*a*) to 12(*c*) are schematic diagrams showing the modified examples of the first and second embodiments of the present invention.
Figure 12B:
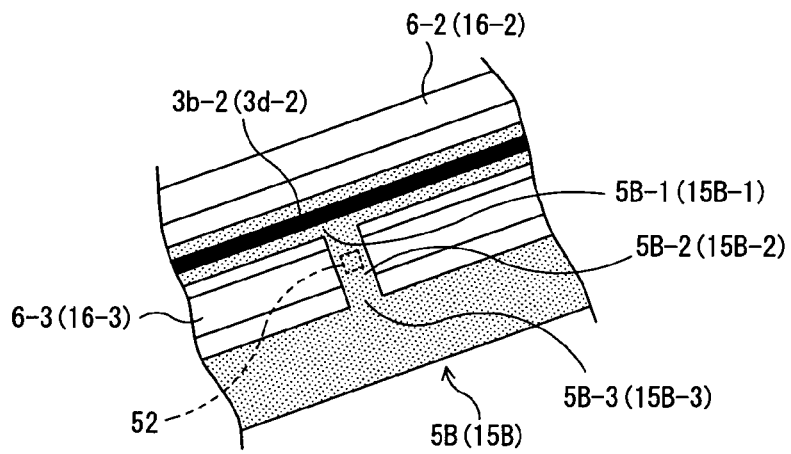
Figure 12C:
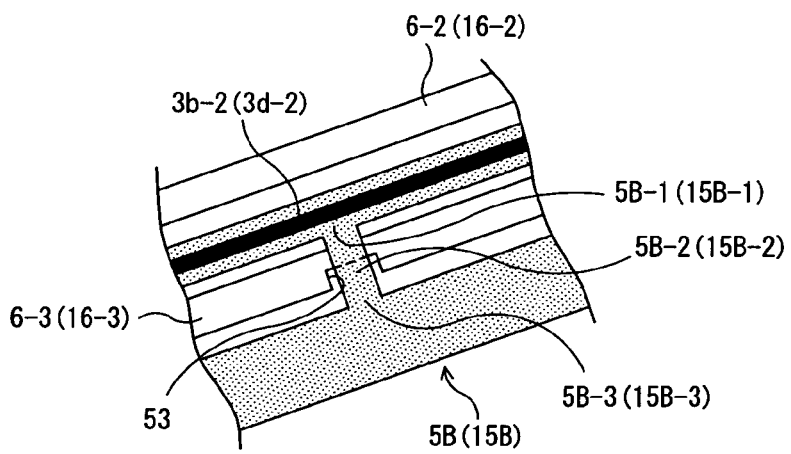

That is, in FIG. 12(*a*), a groove dividing section 51 for dividing the outer groove 6-3 or 16-3 at the position of the second part 5B-2 or 15B-2 is formed as the supporting mechanism for supporting the second part 5B-2 or 15B-2. That is, the second part 5B-2 or 15B-2 is formed by using the groove dividing section 51 as abase, with this, it prevents the ground electrode portion from touching the bottom section of the outer groove 6-3 or 16-3, and the disconnection of the second part 5B-2 or 15B-2 is prevented.

And, in FIG. 12(*b*), an island section 52 disposed at the outer groove 6-3 or 16-3 corresponding to the position of the second part 5B-2 or 15B-2 is formed as the supporting mechanism for supporting the second part 5B-2 or 15B-2. That is, the second part 5B-2 or 15B-2 is formed by using the island section 52 as a base, with this, it prevents the ground electrode portion from touching the bottom section of the outer groove 6-3 or 16-3, and the disconnection of the second part 5B-2 or 15B-2 is prevented.

And, in FIG. 12(*c*), a groove narrow width section 53 in which the outer groove 6-3 or 16-3 was made narrow corresponding to the position of the second part 5B-2 or 15B-2 is formed as the supporting mechanism for supporting the second part 5B-2 or 15B-2. That is, the second part 5B-2 or 15B-2 is formed by using the groove narrow width section 53 as a base, with this, it prevents the ground electrode portion from touching the bottom section of the outer groove 6-3 or 16-3, and the disconnection of the second part 5B-2 or 15B-2 is prevented.

In this, the structure similar to the supporting mechanism 51, 52, or 53 disposed at the position of the second part 5B-2 or 15B-2 at the outer groove 6-3 or 16-3 can be formed as the supporting mechanism for supporting the ground electrode portion at the position of the other grooves 6-4 to 6-8 or 16-4. With this, the disconnection of these positions can be also prevented.

And the optical device of the present invention can be manufacture by each of the above-mentioned embodiments.

What is claimed is:

1. An optical device, comprising:
   a substrate having an electrooptic effect;
   a first ridge section formed by being sandwiched between two grooves formed on said substrate;
   a second ridge section, positioned adjacent to said first ridge section, formed by being sandwiched between one of said two grooves and other groove formed at the outside of said second ridge section;
   an optical waveguide formed inside said first ridge section;
   an optical waveguide formed inside said second ridge section;
   a signal electrode formed above said first ridge section; and
   a ground electrode, which is formed above said substrate in a state in which said ground electrode sandwiches said signal electrode by having a gap of a predetermined interval for said signal electrode for applying reference electric potential to said signal electrode,
   wherein the ratio of the volume of a ground electrode portion formed at the position of said other groove to the area of opening part of said other groove is smaller than the ratio of the volume to the area of a ground electrode portion formed at the position except said other groove.

2. The optical device according to claim 1, wherein said ground electrode provides a first part on said second ridge section, a second part formed at the position of said other groove adjacent to said second ridge section, and a third part formed further outside said second part.

3. The optical device according to claim 2, wherein the difference between the width of said signal electrode and the width of said first part is equal to approximately 5 μm or less.

4. The optical device according to claim 2, wherein the width of said first part is narrower than the width of said second ridge section.

5. The optical device according to claim 2, wherein the width of said first ridge section and the width of said second ridge section are almost the same.

6. The optical device according to claim 2, wherein the relative position relation between said first ridge section and said signal electrode is the same as the relative position relation between said second ridge section and said first part.

7. The optical device according to claim 2, wherein the center of said signal electrode is equal to the center of said first ridge section.

8. The optical device according to claim 2, wherein the center of said first part is equal to the center of said second ridge section.

9. The optical device according to claim 2, wherein the thickness of said signal electrode is almost equal to the thickness of said first part.

10. The optical device according to claim 1, wherein said ground electrode portion formed at the position of said other groove is formed in a plurality of regions by separating each other.

11. The optical device according to claim 10, further comprising:
    a supporting mechanism for supporting said ground electrode portion at the position of said other groove.

12. The optical device according to claim 11, wherein said supporting mechanism is composed of a groove dividing section for dividing said other groove.

13. The optical device according to claim 11, wherein said supporting mechanism is composed of an island section formed in said other groove.

14. The optical device according to claim 11, wherein said supporting mechanism is composed of a groove narrow width section in which the width of said other groove is made narrow.

15. The optical device according to claim 10, wherein said ground electrode portion formed at the position of said other groove is formed in said plurality of regions by separating each other having an interval of approximately 10 μm or more and approximately 5 mm or less.

16. The optical device according to claim 10, wherein each width of said ground electrode portions formed separately each other in said plurality of regions at the position of said other groove is approximately 3 μm to approximately 20 μm.

17. The optical device according to claim 1, wherein said ground electrode portion formed at the position of said other groove is composed as a conductive film being thinner than said ground electrode portion formed at the position except the position of said other groove.

18. The optical device according to claim 17, wherein said ground electrode portion formed at the position except the position of said other groove is composed of a conductive thin film section and a conductive thick film section formed on said conductive film, and said conductive film formed at the position of said other groove is formed integrally together with said conductive thin film section being a part of said ground electrode portion formed at the position except said other groove.

19. The optical device according to claim 18, wherein said thick film section and said conductive thin film section formed integrally together with said conductive film are formed by the same material.

20. The optical device according to claim 17, wherein the thickness of said ground electrode portion formed at the position of said other groove is equal to approximately 1 μm or less.

21. The optical device according to claim 1, wherein at least one of additional outside ridge sections is formed with additional other groove positioned outside said additional outside ridge section at the outside of said first ridge section or the outside of said second ridge section, and
    the ratio of the volume of a ground electrode portion formed at the position of said another groove to the area of opening part of said another groove positioned outside said additional outside ridge section is smaller than the ratio of the volume to the area of a ground electrode portion formed at the position except said other and additional other grooves.

22. The optical device according to claim 21, wherein said additional outside ridge section is formed with additional other groove at the position further outside said additional outside ridge section so that the symmetric number of ridge sections for said first ridge section are formed.

23. The optical device according to claim 21, wherein said ground electrode is configured so that ground electrode portions formed at the positions of plural other grooves are electrically connected to each other, and the ground electrode portion formed at the position of each of other grooves is formed separately in plural regions in a different pattern.

24. The optical device according to claim 1, wherein an optical waveguide formed respectively in said first ridge section and in said second ridge section is a straight line waveguide.

25. The optical device according to claim 1, wherein said optical waveguide formed respectively in said first ridge section and in said second ridge section is a curved waveguide having a curve being equal to 90 degrees or more.

26. An optical device, comprising:
a substrate having an electrooptic effect;
a first ridge section formed by being sandwiched between two grooves formed on said substrate;
a second ridge section, positioned adjacent to said first ridge section, formed by being sandwiched between one of said two grooves and other groove formed at the outside of said second ridge section;
an optical waveguide formed inside said first ridge section;
an optical waveguide formed inside said second ridge section;
a signal electrode formed above said first ridge section; and
a ground electrode formed above said second ridge section,
wherein the difference between the width of said signal electrode above said first ridge section and the width of said ground electrode above said second ridge section is equal to approximately 5 µm or less.

27. A optical device, comprising:
a substrate having an electrooptic effect;
a first ridge section formed by being sandwiched between a groove and another groove formed on said substrate; and
a second ridge section formed by being sandwiched between said another grrove at a first side and a plurality of grooves formed at a second side of said second ridge section, a number of the grooves at said second side being greater than a number of the groove at said first side,
wherein each of said first ridge section and said second ridge section includes an optical waveguide which is covered by a signal electrode or a ground electrode.

28. The optical device according to claim 27, wherein said optical waveguides are curved optical waveguides.

29. The optical device according to claim 27, wherein said optical waveguides are S-shaped optical waveguides.

30. The optical device according to claim 27, wherein said first ridge section includes an optical waveguide which is covered by a signal electrode and said second ridge section includes an optical waveguide which is covered by a ground electrode.

31. An optical device, comprising:
a substrate having an electrooptic effect;
a first ridge section formed by being sandwiched between a groove and another groove formed on said substrate; and
a second ridge section formed by being sandwiched between said another groove at a first side and a plurality of grooves formed at a second side of said second ridge section, dimensions of the grooves at said second side being greater than dimensions of the groove at said first side,
wherein each of said first ridge section and said second ridge section includes an optical waveguide which is covered by a signal electrode or a ground electrode.

32. The optical device according to claim 31, wherein said optical waveguides are curved optical waveguides.

33. The optical device according to claim 31, wherein said optical waveguides are S-shaped optical waveguides.

34. The optical device according to claim 31, wherein said first ridge section includes an optical waveguide which is covered by a signal electrode and said second ridge section includes an optical waveguide which is covered by a ground electrode.

* * * * *

UNITED STATES PATENT AND TRADEMARK OFFICE
CERTIFICATE OF CORRECTION

PATENT NO.       : 7,095,926 B2
APPLICATION NO. : 11/002114
DATED            : August 22, 2006
INVENTOR(S)      : Masaki Sugiyama It is certified that error appears in the above-identified patent and that said Letters Patent is hereby corrected as shown below:

Column 21, Line 32, change "A" to --An--.

Column 21, Line 38, change "grrove" to --groove--.

Signed and Sealed this

Ninth Day of January, 2007

JON W. DUDAS
*Director of the United States Patent and Trademark Office*